US008305750B2

(12) United States Patent
Hsieh

(10) Patent No.: US 8,305,750 B2
(45) Date of Patent: Nov. 6, 2012

(54) ELECTRONIC DEVICE AND PLUG CONNECTOR THEREOF

(75) Inventor: Yung Hsiang Hsieh, Chiayi County (TW)

(73) Assignee: Arcadyan Technology Corporation, Hsinchu (TW)

( * ) Notice: Subject to any disclaimer, the term of this patent is extended or adjusted under 35 U.S.C. 154(b) by 251 days.

(21) Appl. No.: 12/903,361

(22) Filed: Oct. 13, 2010

(65) Prior Publication Data

US 2011/0199729 A1 Aug. 18, 2011

(30) Foreign Application Priority Data

Feb. 12, 2010 (TW) ................................ 99203218 U

(51) Int. Cl.
*G06F 1/16* (2006.01)

(52) U.S. Cl. ................... 361/679.33; 439/884; 345/161; 360/244.5; 200/284

(58) Field of Classification Search .................. 363/141, 363/146; 439/345, 172, 63, 55, 187, 131, 439/884, 149, 595, 852, 59, 326; 361/679.33, 361/679.08, 679.32, 679.31, 679.29, 679.02, 361/679.07, 679.47, 679.58, 676, 785; 345/690, 345/156, 161; 360/244.2, 244.5, 99.23; 235/383, 235/128, 78, 441, 462.14, 404, 414, 411, 235/408; 200/431, 280, 278, 184, 221, 243, 200/284, 18, 534
See application file for complete search history.

(56) References Cited

U.S. PATENT DOCUMENTS

| | | | | |
|---|---|---|---|---|
| 4,795,352 | A * | 1/1989 | Capp et al. | 439/63 |
| 2007/0217242 | A1* | 9/2007 | Dayan et al. | 363/146 |
| 2009/0142970 | A1* | 6/2009 | Patel et al. | 439/712 |
| 2012/0034803 | A1* | 2/2012 | Sasaki et al. | 439/345 |

* cited by examiner

*Primary Examiner* — Hung Duong
(74) *Attorney, Agent, or Firm* — Rosenberg, Klein & Lee

(57) ABSTRACT

An electronic device includes a circuit module with a circuit board, and a plug connector with a supporting base, several terminals, and an outer shell. The terminals are disposed at the supporting base, and connected to the circuit board. The outer shell surrounds the supporting base, and has two parallel horizontal plates. Two extending plates are extended from a front surface of one of the horizontal plates. A slot is formed among that horizontal plate and the two extending plates. Via these arrangements, the out shell of the plug connector has the slot, so that the deformation of the outer shell is more easily caused. Thus, even if the assembly tolerance between the plug connector and the socket connector is deviated, the force for plugging or unplugging the plug connector would not be too abnormal. That is because the outer shell can be easily deformed to compensate for the deviation.

10 Claims, 3 Drawing Sheets

ELECTRONIC DEVICE AND PLUG CONNECTOR THEREOF

BACKGROUND OF THE INVENTION

1. Field of the Invention

The present invention relates to an electronic device and a plug connector thereof; particularly, the present invention relates to structural improvements of the electronic device and the plug connector thereof.

2. Description of Related Art

Flash disc drive is an electronic device which many people own and favor, because it has a small volume, a convenient application, a reasonable price, and other advantages.

Pleases refer to FIG. 1, a conventional flash disc driver is shown. The flash disk drive has an external plug connector 10A which comprises a supporting plate 11A, a plurality of terminals 12A, and a metal shell 13A. These terminals 12A are embedded in the supporting plate 11A; the metal shell 13A surrounds the supporting plate 11A. The function of the metal shell 13A is to enhance the mechanical strength of the plug connector 10A, so that the plug connector 10A would not be easily damaged while inserting into a socket connector (not shown) or being stored and carried.

When manufactured, each component of the plug connector 10A and socket connector would meet the standard of dimensions as much as possible. However, deviations are inevitably generated. These manufacturing deviations would lead to other deviations on the assembly tolerance between the plug and socket connectors, so that force for plugging or unplugging the plug connector 10A with the socket connector would be too tight or loose. Further, because the metal shell 13A is a continuous frame-shaped structure and firmly connected with a main shell connected with the plug connector 10A, the sizes of the metal shell 13A are difficult to adjust, resulting in that the abnormal force for plugging or unplugging is hardly improved.

In addition to the flash disk drive, other electronic devices with plug connector also face the same problem of the abnormal force for plugging or unplugging.

Hence, the inventors of the present invention believe that the shortcomings described above are able to be improved and finally suggest the present invention which is of a reasonable design and is an effective improvement based on deep research and thought.

SUMMARY OF THE INVENTION

In view of the aforementioned issues, the present invention provides an electronic device and a plug connector thereof; while the assembly tolerance between the plug and socket connectors is deviated, users still can easily plug or unplug the plug connector with the socket connector.

To achieve the above-mentioned objectives, the present invention provides a plug connector of an electronic device, which comprises a supporting base, a plurality of terminals, and an outer shell. The terminals are disposed at the supporting base, and rear ends of the terminals are connected to the circuit board. The outer shell surrounds the supporting base, and has a first horizontal plate and a second horizontal plate parallel to the first horizontal plate. Two first extending plates are extended from a front surface of the first horizontal plate. A first slot is formed among the first horizontal plate and the two first extending plates, so that an area of the supporting base corresponding to the first slot would not be covered, instead exposed.

In one preferable embodiment, the area corresponding to the first slot is disposed with the terminal. Moreover, two second extending plates are extended from a front surface of the second horizontal plate. A second slot is formed among the second horizontal plate and the second extending plates, so that another area of the supporting base corresponding to the second slot would be exposed.

To achieve the above-mentioned objectives, the present invention further provides an electronic device, which comprises a circuit module with a circuit board, and a plug connector with a supporting base, a plurality of terminals, and an outer shell. The terminals are disposed at the supporting base, and rear ends of the terminals are connected to the circuit board. The outer shell surrounds the supporting base, and has a first horizontal plate and a second horizontal plate parallel to the first horizontal plate. Two first extending plates are extended from a front surface of the first horizontal plate. A first slot is formed among the first horizontal plate and the two first extending plates, so that an area of the supporting base corresponding to the first slot would not be covered, instead exposed.

In one preferable embodiment, the area corresponding to the first slot is disposed with the terminal. Moreover, two second extending plates are extended from a front surface of the second horizontal plate. A second slot is formed among the second horizontal plate and the second extending plates, so that another area of the supporting base corresponding to the second slot would be exposed.

The present invention provides, at least, efficacies as follow: the out shell of the plug connector has the first slot or the second slot, so that the deformation of the outer shell is more easily caused. Therefore, even if the assembly tolerance between the plug connector and the socket connector is deviated from an expected value, the force exerting on the plug connector for plugging or unplugging the plug connector would not be too large or small. That is because the outer shell could be easily deformed to compensate for the deviation of assembly tolerance.

In order to further understand the techniques, means and effects the present invention takes for achieving the prescribed objectives, the following detailed descriptions and appended drawings are hereby referred, such that, and through which, the purposes, features, and aspects of the present invention are able to be thoroughly and concretely appreciated. It is to be understood, however, that the appended drawings are provided solely for reference and illustration, without any intention that they be used for limiting the present invention.

DETAILED DESCRIPTION OF THE PREFERRED EMBODIMENTS

Figure 1:
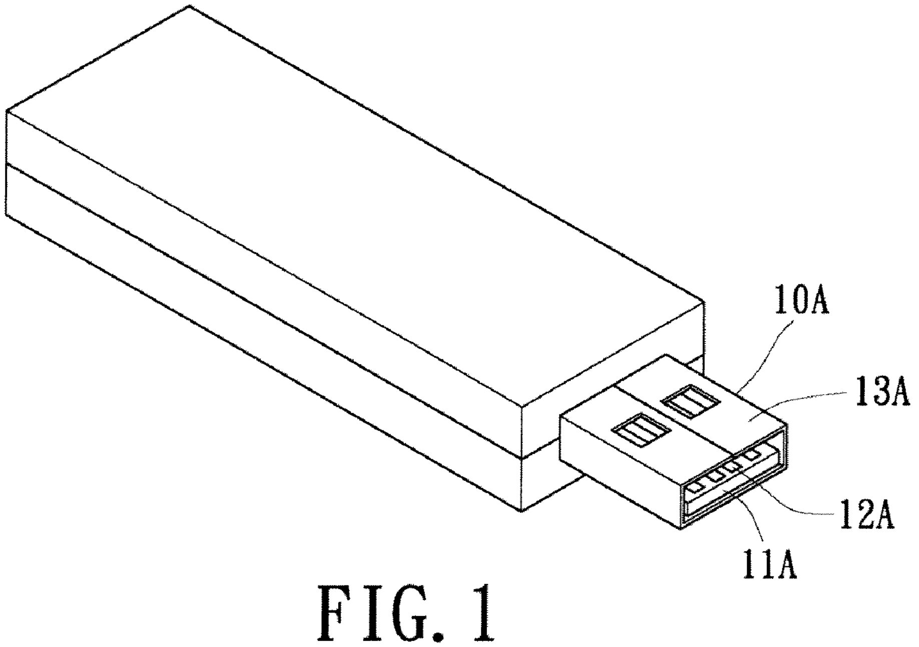
FIG. 1 PRIOR ART
FIG. 1 is a schematic drawing of a conventional flash disk drive.
Figure 2:
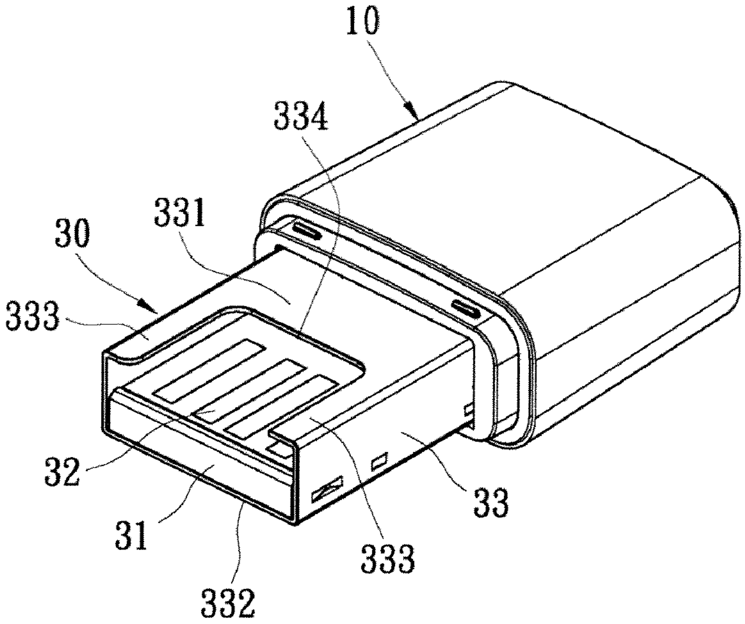
FIG. 2 is a perspective assembly drawing of an electronic device and a plug connector thereof according to one preferable embodiment of this invention.
Figure 3:
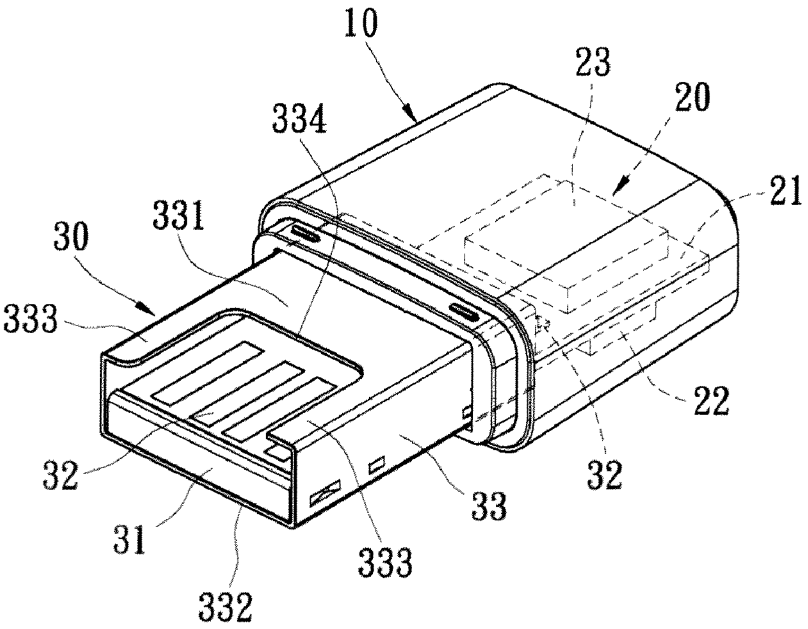
FIG. 3 is still a perspective assembly drawing of the electronic device and the plug connector thereof according to one preferable embodiment of this invention.

Please refer to FIGS. 2 and 3, an electronic device and a plug connector 30 according to one preferable embodiment of this invention is shown. The electronic device, as a example and not limited, may be a flash disk drive; in other embodiments, it may be mouse, keyboard, digital TV stick, card reader, wireless communication device, and any utilizing the plug connector 30. The plug connector 30, as a example and not limited, is a universal serial bus (USB) plug connector; in other embodiments, it may be a high definition media interface (HDMI) plug connector, and other widely used plug connector.

Following is a description for the structural features of the electronic device and the plug connector 30 according to the preferable embodiment, next is a description for the efficacies thereof.

The electronic device comprises a main shell 10, a circuit module 20, and the plug connector 30.

The main shell 10 may have a rectangular-block shape, and a hollow interior. The circuit module 20 is accommodated and fixed within the main shell 10, and has a circuit board 21, a controller 22, and a memory 23. The controller 22 and the memory 23 are both welded, or inserted, to the circuit board 21. The memory 23 can store and keep data therein, and the controller 22 can control the access of data stored in the memory 23. Because the details of how controller 22 and memory 23 work are not critical for this embodiment, they will not proceed. Further, the circuit module 20 may have other components (not shown), such as LED for indicating. If the electronic device were a wireless communication device, the circuit module 20 thereof would have an antenna, a signal processing chip, and so on.

As a whole, the plug connector 30 has one portion received within the main shell 10, and another portion extending to the front of the main shell 10. The plug connector 30 comprises a supporting base 31, a plurality terminals 32, and an outer shell 33. The supporting base 31 may be made of insulation material. The terminals 32 are disposed at the supporting base 31; or more correctly, front portions of the terminals 32 are embedded in the supporting base 31, and rear portions of the terminals 32 are extended to the back of the supporting base 31. The rear portions of the terminals 32 are further welded to the circuit board 21, so as to be electrically connected to the circuit board 21, controller 22, and the memory 23.

The outer shell 33 is approximately a rectangular frame body, and surrounds the supporting base 31. In other words, the supporting base 31 is inside the outer shell 33. The outer shell 33 has a first horizontal plate 331 and a second horizontal plate 332; the first horizontal plate 331, the second horizontal plate 332, and the supporting base 31 are parallel to one another. The first horizontal plate 331 may be separated from the supporting base 31, or not contacted with each other. The rear surfaces of the first horizontal plate 331 and second horizontal plate 332 are coplanar, but the front surfaces of theirs are not. The length of first horizontal plate 331 is shorter than that of the second horizontal plate 332. Two first extending plates 333 are extended from the front surface of the first horizontal plate 331, and therefore a first slot 334 is formed among the first horizontal plate 331 and the two first extending plates 333.

Because of the existence of the first slot 334, the area of the supporting base 31 corresponding to, i.e. below, the first slot 334 would not be covered, and instead exposed. The area corresponding to the first slot 334 may be disposed with the terminals 32, so that the terminals 32 could be observed from the first slot 334.

Figure 4:
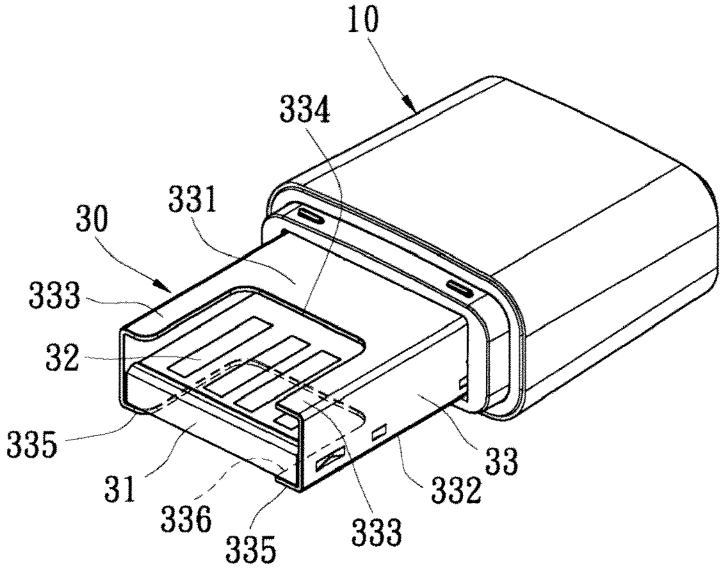
FIG. 4 is a perspective assembly drawing of an electronic device and a plug connector thereof according to another preferable embodiment of this invention.

Please refer to FIG. 4, another preferable embodiment is shown. In this embodiment, two second extending plate 335 are extended from the front surface of the second horizontal plate 332, similar to the first horizontal plate 331, and therefore a second slot 336 is formed among the second horizontal plate 332 and the two extending plates 335. In this way, the area of the supporting base 31 corresponding to, i.e. above, the second slot 336 would not be covered, and instead exposed.

Figure 5:
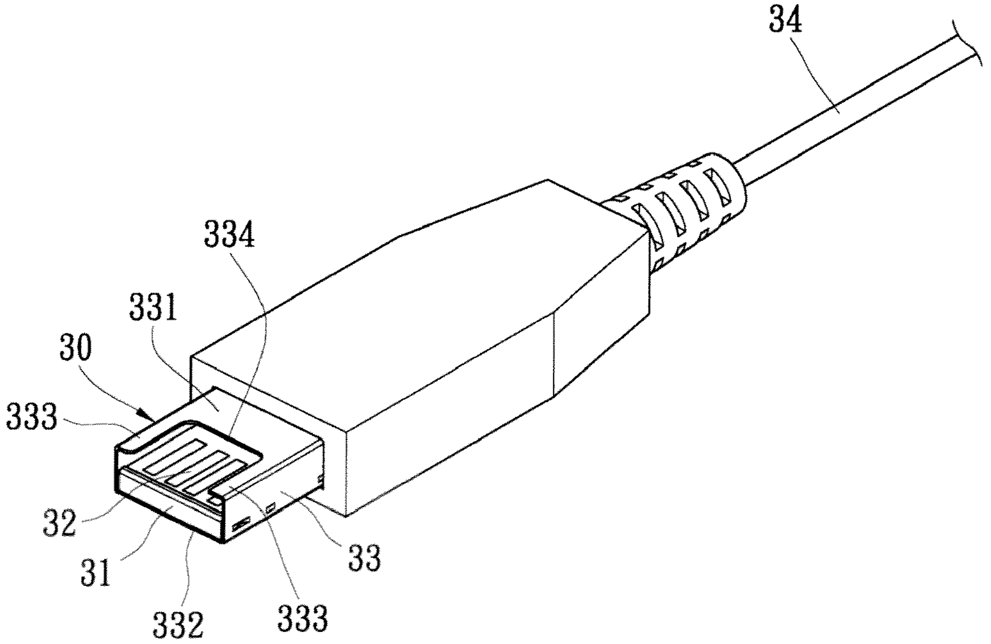
FIG. 5 is a perspective assembly drawing of an electronic device and a plug connector thereof according to a further one preferable embodiment of this invention.

Please refer to FIG. 5, a further preferable embodiment is shown. In this embodiment, the rear ends of the terminals 32 are not directly welded to the circuit board 21, and instead connected to the circuit board 21 via a cable 34. To be more detailed, the front end of the cable 34 is connected to the rear portions of the terminals 32, and the rear end of the cable 34 is connected to the circuit board 21. In this way, the terminals 32 are still electrically connected with the circuit module 20.

The foregoing is the description for some structural features of the electronic device and the plug connector 30 according to the preferable embodiments, and the following is a description for some the efficacies thereof.

The out shell 33 has the first slot 334 or the second slot 336, so that the deformations of both and upper sides of the outer shell 33 more tend to be larger. Therefore, even if the assembly tolerance between the plug connector 30 and the socket connector (not shown) is deviated from an expected value, such as the terminals 32 are not quite matched with the corresponding terminals of the socket connector, the force exerting on the plug connector 30 for plugging or unplugging would not be too large or small. That is because the outer shell 33 can be easily deformed to compensate for the deviation of assembly tolerance while the plug connector 30 plugging or unplugging with the socket connector.

The above-mentioned descriptions represent merely the preferred embodiment of the present invention, without any intention to limit the scope of the present invention. Various equivalent changes, alternations or modifications based on the claims of the present invention are all consequently viewed as being embraced by the scope of the present invention.

What is claimed is:

1. A plug connector of an electronic device comprising:

a supporting base;

a plurality of terminals, disposed at the supporting base; and an outer shell, surrounding the supporting base and having a first horizontal plate and a second horizontal plate parallel to the first horizontal plate, wherein two first extending plates are extended from a front surface of the first horizontal plate, a first slot is formed among the first horizontal plate and the two first extending plates.

2. The plug connector of claim 1, wherein rear ends of the terminals are welded to a circuit board of the electronic device.

3. The plug connector of claim 1, further comprising a cable, wherein a front end of the cable is welded to rear ends of the terminals.

4. The plug connector of claim 1, wherein an area of the supporting base, where the terminals are disposed, is corresponding to the first slot.

5. The plug connector of claim 1, wherein two second extending plates are extended from a front surface of the second horizontal plate, a second slot is formed among the second horizontal plate and the second extending plates.

6. The plug connector of claim 1, wherein the plug connector is a USB plug connector or a HDMI plug connector.

7. An electronic device comprising:

a circuit module, having a circuit board; and a plug connector, comprising a supporting base, a plurality of terminals, and an outer shell, wherein the terminals are disposed at the supporting base, rear ends of the terminals are connected to the circuit board, the outer shell surrounds the supporting base and has a first horizontal plate and a second horizontal plate parallel to the first horizontal plate, two first extending plates are extended from a front surface of the first horizontal plate, a first slot is formed among the first horizontal plate and the two first extending plates.

8. The electronic device of claim 7, wherein rear ends of the terminals are welded to the circuit board.

9. The electronic device of claim 7, wherein two second extending plates are extended from a front surface of the second horizontal plate, a second slot is formed among the second horizontal plate and the second extending plates.

10. The electronic device of claim 7, wherein the electronic device is a flash disk drive or a wireless communication device.

* * * * *